(12) United States Patent
Becker

(10) Patent No.: US 8,560,687 B1
(45) Date of Patent: *Oct. 15, 2013

(54) MANAGING THE PERFORMANCE OF AN ELECTRONIC DEVICE

(75) Inventor: Glen Alan Becker, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/276,095

(22) Filed: Oct. 18, 2011

Related U.S. Application Data

(63) Continuation of application No. 11/731,044, filed on Mar. 30, 2007, now Pat. No. 8,041,808.

(51) Int. Cl.
*G06F 15/173* (2006.01)

(52) U.S. Cl.
USPC ........... 709/224; 702/179; 702/182; 702/186; 708/274; 708/277

(58) Field of Classification Search
USPC ............. 700/28–55; 702/179–186; 706/1–62, 706/908, 909, 916, 917, 934; 708/270–277; 709/223, 224
See application file for complete search history.

(56) References Cited

U.S. PATENT DOCUMENTS

| | | | |
|---|---|---|---|
| 6,038,391 A | 3/2000 | Kawaba | |
| 6,311,175 B1 | 10/2001 | Adriaans et al. | |
| 6,453,269 B1 | 9/2002 | Quernemoen | |
| 6,470,464 B2 | 10/2002 | Bertram et al. | |
| 6,574,587 B2 | 6/2003 | Waclawski | |
| 6,609,083 B2 | 8/2003 | Enck et al. | |
| 6,643,613 B2 | 11/2003 | McGee et al. | |
| 6,643,614 B2 | 11/2003 | Ding et al. | |
| 6,691,067 B1 | 2/2004 | Ding et al. | |
| 6,738,933 B2 | 5/2004 | Fraenkel et al. | |
| 6,745,011 B1 | 6/2004 | Hendrickson et al. | |
| 6,799,154 B1 | 9/2004 | Aragones et al. | |
| 6,826,575 B1 | 11/2004 | Waclawski | |
| 6,836,800 B1 | 12/2004 | Sweet | |
| 6,876,988 B2 | 4/2005 | Helsper et al. | |
| 6,901,442 B1 | 5/2005 | Schwaller | |

(Continued)

OTHER PUBLICATIONS

Waner, Fitting Functions to Data: Linear and Exponential Regression, Feb. 1998, http://people.hofstra.edu/stefan_waner/realworld/calctopic1/regression.html, Accessed on Feb. 25, 2012.*

(Continued)

*Primary Examiner* — Liangche A Wang
*Assistant Examiner* — Sherman Lin
(74) *Attorney, Agent, or Firm* — Brooks, Cameron & Huebsch, PLLC

(57) ABSTRACT

A performance management system and method for generating a plurality of forecasts for one or more electronic devices is presented. The forecasts are generated from stored performance data and analyzed to determine which devices are likely to experience performance degradation within a predetermined period of time. A single forecast is extracted for further analysis such that computer modeling may be performed upon the performance data to enable the user to predict when device performance will begin to degrade. In one embodiment, graphical displays are created for those devices forecasted to perform at an undesirable level such that suspect devices may be subjected to further analysis.

17 Claims, 7 Drawing Sheets

(56) References Cited

U.S. PATENT DOCUMENTS

| | | | |
|---|---|---|---|
| 6,917,849 B1 | 7/2005 | Pasadyn et al. | |
| 6,978,259 B1 | 12/2005 | Anderson et al. | |
| 7,076,397 B2 | 7/2006 | Ding et al. | |
| 7,467,145 B1 | 12/2008 | Castellanos | |
| 7,849,069 B2 | 12/2010 | Liu | |
| 2002/0049687 A1 | 4/2002 | Helsper et al. | |
| 2002/0069037 A1 | 6/2002 | Hendrickson et al. | |
| 2002/0122647 A1 | 9/2002 | Blomquist et al. | |
| 2002/0133757 A1 | 9/2002 | Bertram et al. | |
| 2002/0183972 A1 | 12/2002 | Enck et al. | |
| 2002/0194251 A1 | 12/2002 | Richter | |
| 2002/0198985 A1 | 12/2002 | Fraenkel et al. | |
| 2003/0016360 A1* | 1/2003 | Chase et al. | 356/432 |
| 2003/0036890 A1 | 2/2003 | Billet et al. | |
| 2003/0046270 A1 | 3/2003 | Leung | |
| 2003/0065548 A1 | 4/2003 | Schmidt | |
| 2003/0065554 A1 | 4/2003 | Bataveljic et al. | |
| 2003/0065986 A1 | 4/2003 | Fraenkel et al. | |
| 2003/0167151 A1 | 9/2003 | Ding et al. | |
| 2003/0225877 A1 | 12/2003 | Packman et al. | |
| 2004/0010643 A1 | 1/2004 | Thomas | |
| 2004/0122647 A1* | 6/2004 | Monroe et al. | 703/22 |
| 2004/0133395 A1* | 7/2004 | Ding et al. | 702/182 |
| 2004/0138826 A1 | 7/2004 | Carter, Jr. et al. | |
| 2005/0097207 A1 | 5/2005 | Gluhovsky et al. | |
| 2005/0102175 A1 | 5/2005 | Dudat et al. | |
| 2005/0165519 A1 | 7/2005 | Ariyur et al. | |
| 2005/0169186 A1 | 8/2005 | Qiu et al. | |
| 2005/0278703 A1 | 12/2005 | Lo et al. | |
| 2006/0013134 A1 | 1/2006 | Neuse | |
| 2006/0020866 A1 | 1/2006 | Lo et al. | |
| 2006/0020923 A1 | 1/2006 | Lo et al. | |
| 2006/0020924 A1 | 1/2006 | Lo et al. | |
| 2006/0117059 A1 | 6/2006 | Freeman, Jr. et al. | |
| 2006/0265713 A1 | 11/2006 | Depro | |
| 2007/0005297 A1 | 1/2007 | Beresniewicz et al. | |
| 2007/0061450 A1 | 3/2007 | Burnley et al. | |
| 2007/0198699 A1* | 8/2007 | Peracha et al. | 709/224 |
| 2008/0184262 A1 | 7/2008 | Ginis et al. | |
| 2008/0231750 A1 | 9/2008 | Suzuki | |

OTHER PUBLICATIONS

Foxon, T. et al., "Capacity planning in client-server systems," Dist. Syst. Engng., 1996, 3, pp. 32-38.

Meyer, B. et al., "Defining Policies for Performance Management in Open Distributed Systems," DFG, 1994, 10 pages.

Norton, T., "Simalytic Hybrid Modeling: Planning the Capacity of Client/Server Applications," Draft for IMACS World Congress 1997, 1996, pp. 1-12.

Walpole, Myers, Myers and Ye. "Probability and Statistics for Engineers and Scientists," Seventh Edition. Prentice Hall, NJ. 2002. pp. 224, 297, and 330-331.

\* cited by examiner

MANAGING THE PERFORMANCE OF AN ELECTRONIC DEVICE

CROSS-REFERENCE TO RELATED APPLICATIONS

This application is a Continuation of Ser. No. 11/731,044, filed on Mar. 30, 2007, and is related by subject matter to the inventions disclosed in the following commonly assigned applications, the entirety of which are hereby incorporated by reference herein: U.S. patent application Ser. No. 11/731,073, filed on Mar. 30, 2007, U.S. patent application Ser. No. 11/731,046, filed on Mar. 30, 2007, now U.S. Pat. No. 7,689,384, issued on Mar. 30, 2010, and U.S. patent application Ser. No. 11/731,050, filed on Mar. 30, 2007, each entitled "Managing the Performance of an Electronic Device."

BACKGROUND OF THE INVENTION

Managing a computer system which includes a plurality of devices such as networks or servers, is of special interest to data processing or information technology personnel. Such computer systems typically include a plurality of diverse devices including memory, disks, local area network (LAN) adaptors and central processing units (CPUs) which interact in various ways to facilitate data processing applications.

As systems become larger and more complex, interactions between electronic devices become harder to define, model, and/or predict. Such systems may suffer from inefficiencies or "bottlenecks" that slow or even stop the system.

Often, the performance of a computer system or network is less than it could be because of one or more components having an inappropriate load applied thereto. Thus, it is desirable to know what changes to the system would be required in order to improve capacity of each electronic device. Further, such changes would allow the manipulation of a preset number of electronic devices instead of the system as a whole. To accomplish this, there remains a need for a system and method capable of collecting and analyzing performance data such that it may be utilized to predict future performance of individual electronic devices.

SUMMARY OF THE INVENTION

Embodiments are directed to improving the management of performance issues related to electronic devices, such as a plurality of servers. Irrelevant data may be disregarded or eliminated to improve interpretation of data related to the network of servers. Additionally or alternately, linear models may be implemented in analyzing the data.

These and other features described in the present disclosure will become more fully apparent from the following description and obtained by means of the instruments and combinations particularly pointed out in the appended claims, or may be learned by the practice of the systems and methods set forth herein. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings.

DETAILED DESCRIPTION OF ILLUSTRATIVE EMBODIMENTS

The present invention is herein described as a method of managing one or more electronic devices and as a computer system for managing one or more electronic devices.

Figure 1:
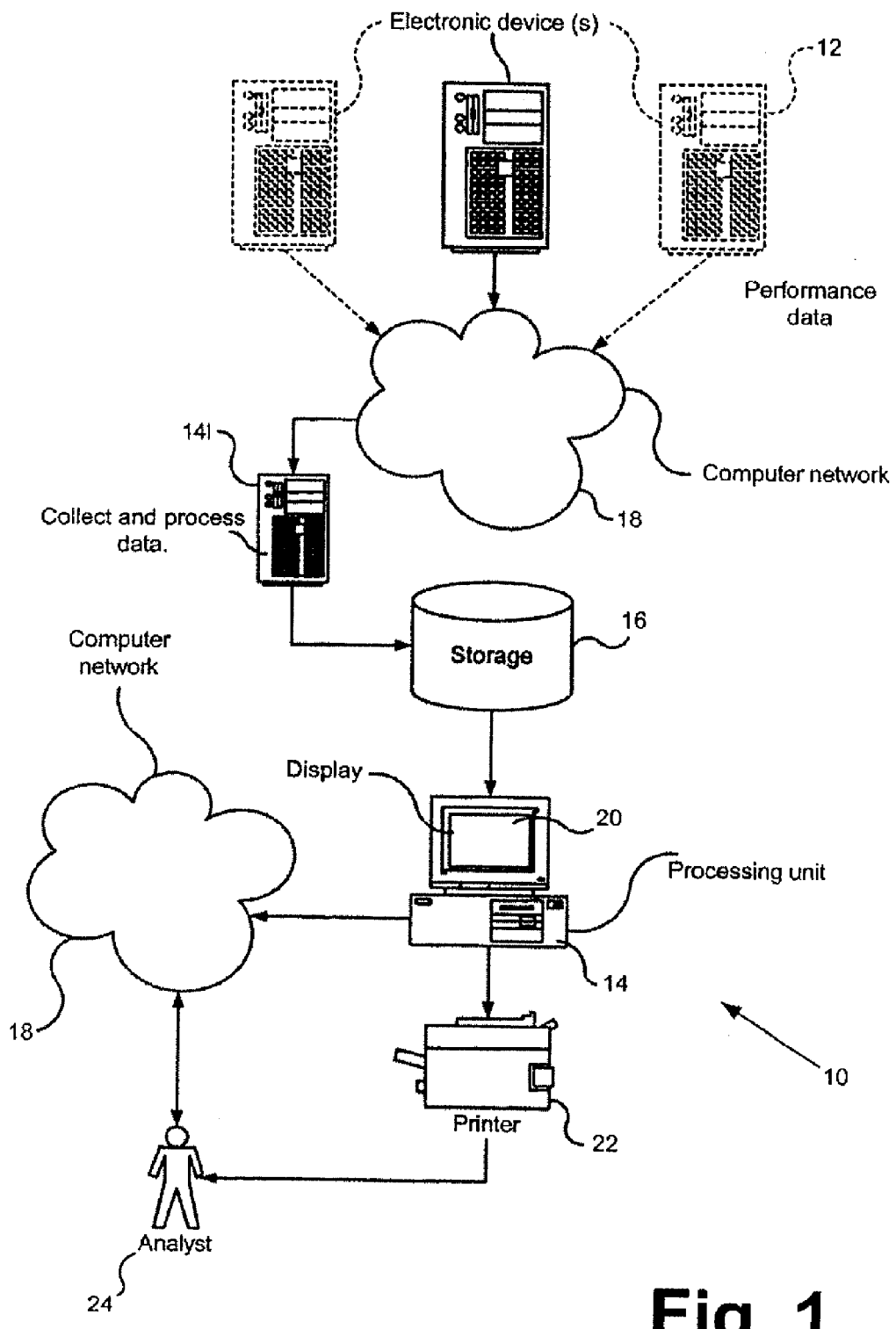
FIG. 1 is a component diagram of one embodiment of the present invention.

Referring to FIG. 1, the computer system 10 of the present invention is capable of receiving and analyzing data from any number of electronic devices 12. In one embodiment, data describing the performance of such devices is collated and processed by an intermediate processing unit 141 prior to the storage of the data upon a storage device 16.

In another embodiment, performance data is fed through a computer network for storage upon the storage device. In this embodiment, the data is collated and processed by a central processing unit 14 coupled to each electronic device, as well as the computer network.

In one embodiment, the processing unit 14 of the present invention is equipped with a graphic display interface 20 capable of providing graphical displays of analyzed performance data, as discussed further below.

In one embodiment, the results of analysis performed by the processing unit may be sent either to a printer 22 for the creation of hard copy reports, or electronically to one or more analysis personnel 24. In one embodiment, such analyzed information may be transmitted through one or more computer networks 18. Further, the reporting capabilities of the present invention allow this system to provide the analyst with analysis summaries. This feature of the present invention provides the analyst with an overview of one or more of the electronic devices at issue, in order to allow the analyst to make an informed decision regarding which devices require attention.

For the purposes of illustration only, in one embodiment, the present invention may be utilized to determine when to upgrade an Intel® server, such as a Compaq® Pentium II® having a quad processor running at 333 MHz. A performance data collection tool residing on the server, Best 1 for example, is capable of capturing performance data every few seconds. Data is then sent to an IBM R/S 6000 midrange server, via a local area network (LAN), where it is collected and processed. A batch job is then run, using SAS® Proc Reg for example, which appends the data into a database stored on a storage area network (SAN). The data may then be gathered from the SAN and analyzed according to the present invention using, for example, a Dell® Desktop computer having a Pentium IV® processor operating at 1.7 GHz. Capacity charts may be displayed on the computer's monitor, sent to a printer, and/or stored electronically on the SAN.

Figure 2:
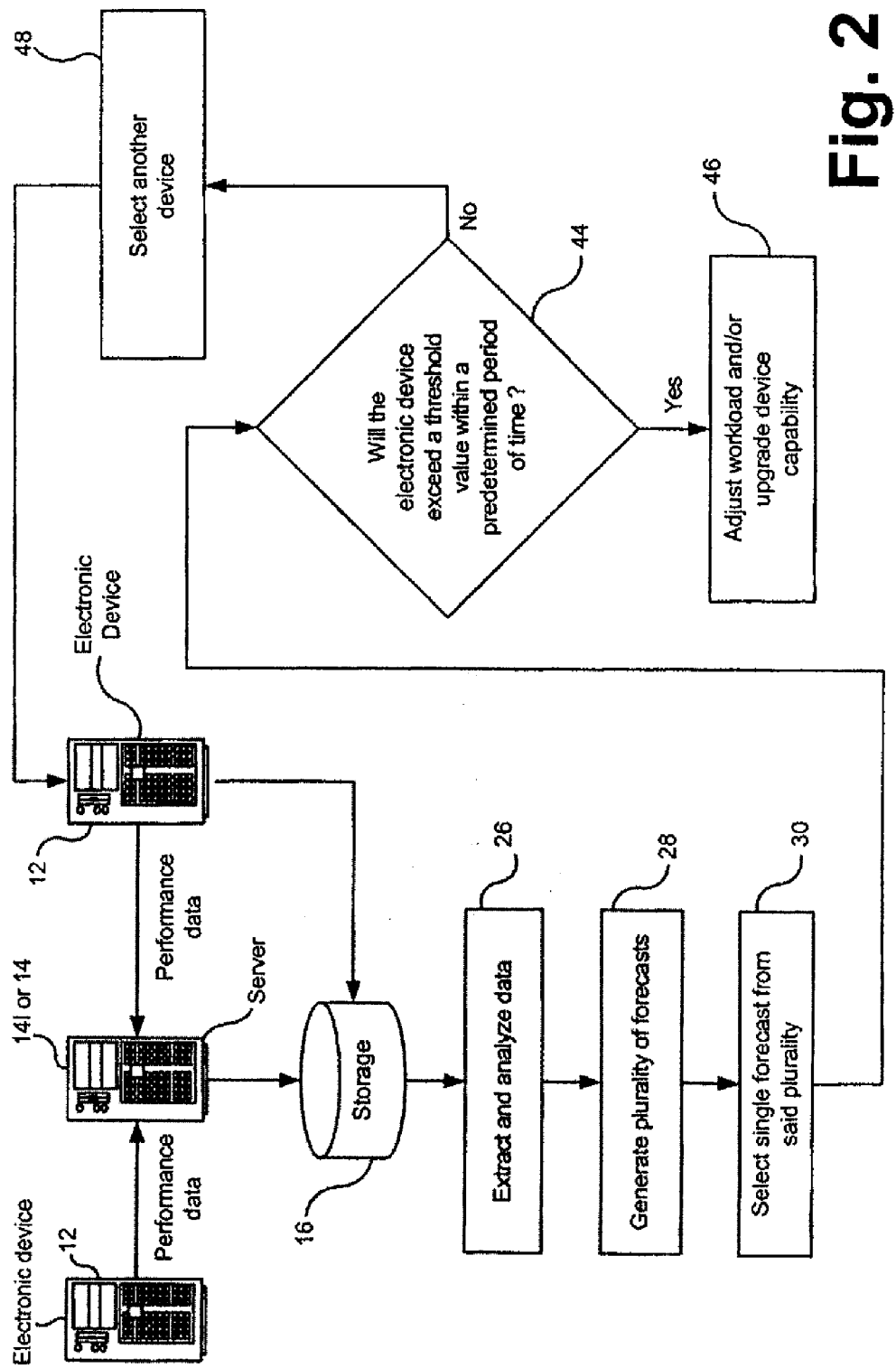
FIGS. 2, 3, 5, and 6 are process flow diagrams illustrating various embodiments of the present invention.
Figure 3:
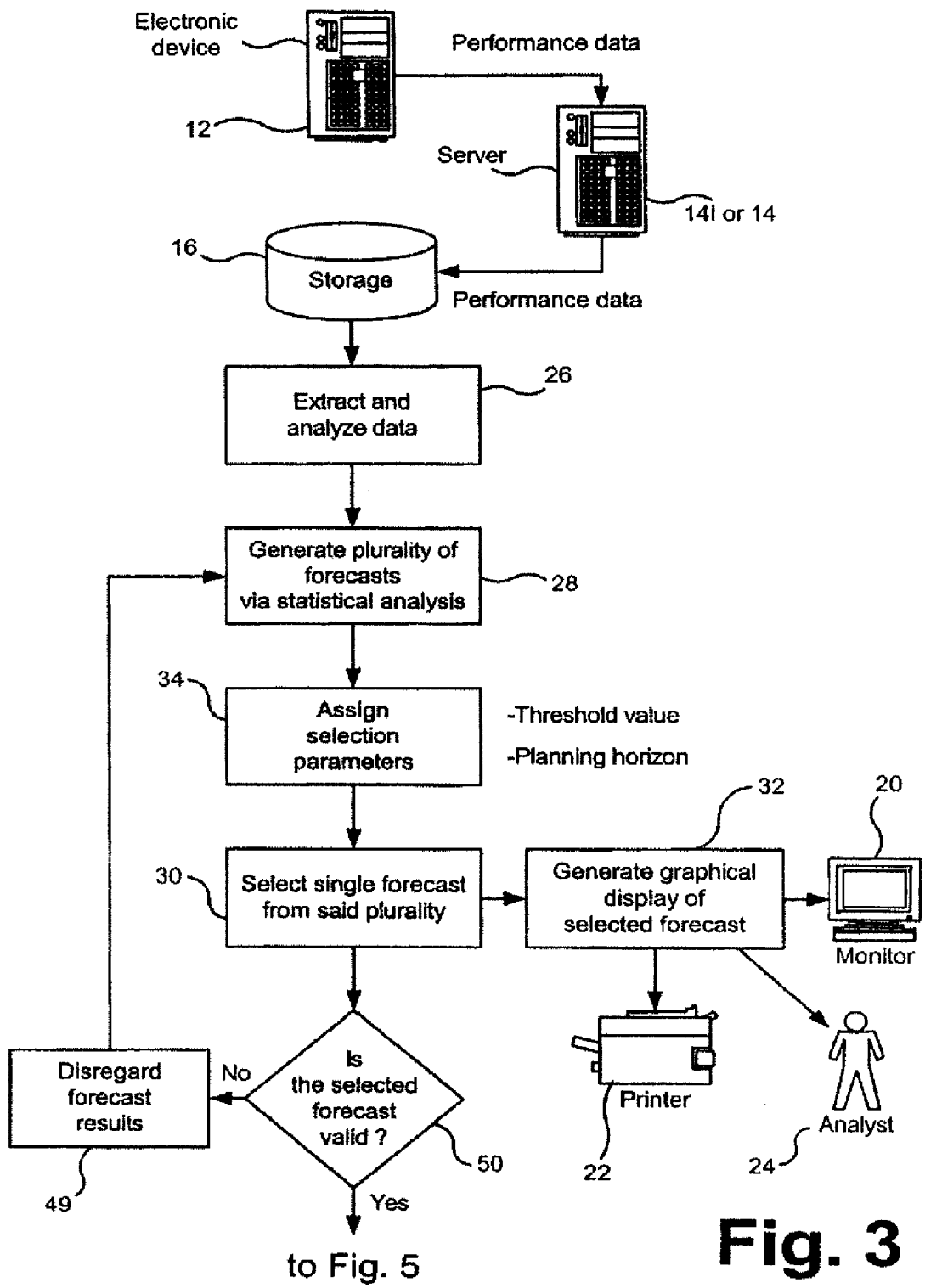

Referring to FIGS. 2 and 3, the present invention is capable of collecting data from a host of electronic devices in order to determine potential performance degradation over time. Referring to box 26, the present invention extracts and analyzes performance data held upon a storage device 16. In one embodiment, performance data is collected and analyzed by an intermediate processing unit 141, described above. During processing, the data may be formatted such that it may be analyzed by any number of known statistical analysis systems. In one embodiment, performance data is analyzed by Statistical Analysis System® (SAS) software capable of applying a host of statistical procedures and data management tools.

Such statistical analysis systems are utilized by the present invention to generate a plurality of forecasts relating to the performance of one or more electronic devices. In one embodiment, the present invention is utilized to analyze one or more servers such that a plurality of forecasts may be generated for each one, as illustrated by box 28.

The present invention may utilize any number of known statistical methods, in order to generate a plurality of forecasts for each device. In one embodiment, the system 10 of the present invention generates graphical displays of each forecast for review by the user, as illustrated by box 32. In one embodiment, such displays may be used to provide the user with an overview of a device's capacity as well as fluctuations over any given period of time.

Figure 4:
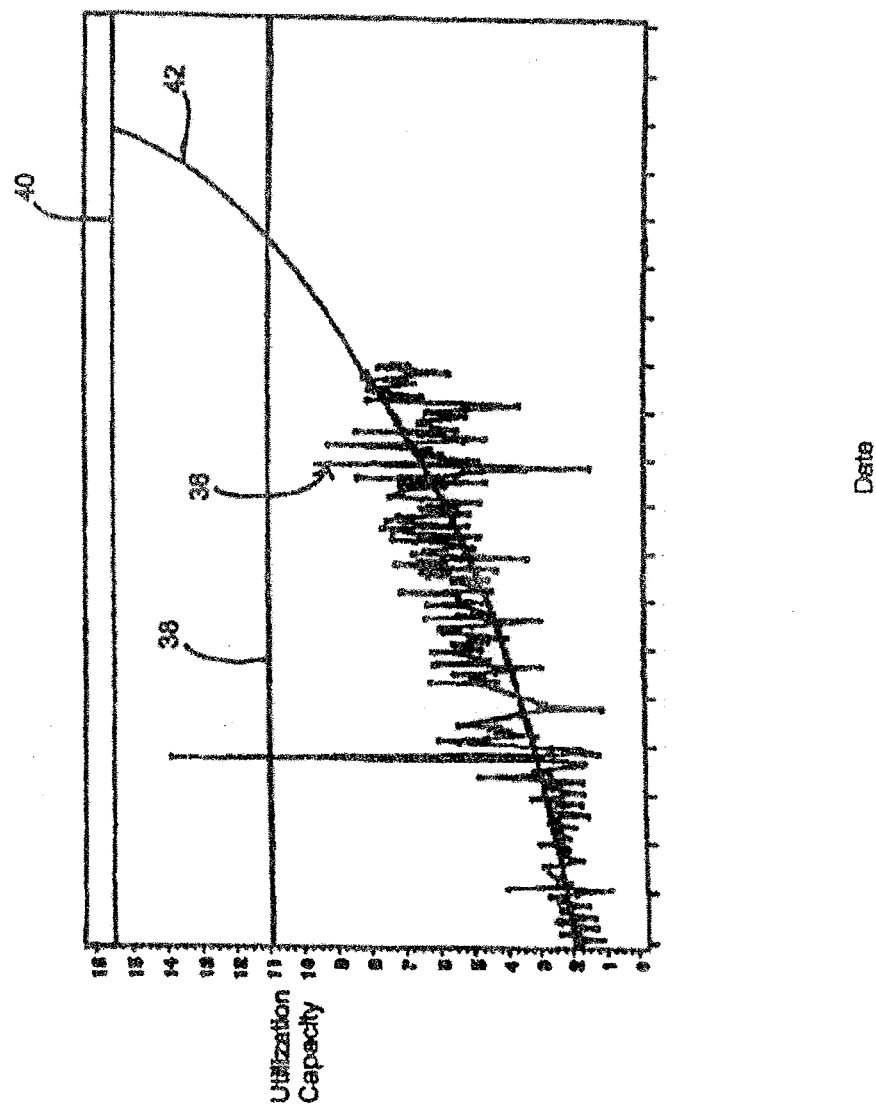
FIG. 4 is a graphical display illustrating the data modeling and analysis process of one embodiment of the present invention.

The processing unit 14 of the computer system 10 of the present invention selects a single forecast from the plurality of forecasts generated, as illustrated by box 30. In one embodiment, this is accomplished via the assignment of selection parameters by the user or analyst, as illustrated by box 34. These parameters may consist of a threshold value relating to the device data being analyzed or a predetermined time period. For example, the graphical display of FIG. 4, illustrates "device capacity" on the Y-axis, and "time" on the X-axis. In this example, a capacity threshold of 11 SPECint95, an industry standard performance benchmark, has been selected in order to enable the system to readily ascertain capacity readings above this threshold value. By setting such a threshold value, the user may instruct the system to single out forecasts showing capacity readings above or below a preset figure. In one embodiment, the threshold value is determined to be the point at which the capacity of the device or devices in question begin to degrade. In another embodiment, a threshold capacity of 70% measured in relation to the maximum capacity of the device is utilized.

Multiple selection parameters may be assigned to enable the system to single out individual forecasts having particular attributes. For example, if the user assigns a capacity threshold of 11 SPECint95 and a planning horizon of January, 2003, the graphical display of FIG. 4 would be flagged by the system such that further review may be conducted by an analyst. Specifically, the selected capacity of 11 SPECint95 is forecasted to exceed prior to the planning horizon date of January, 2003. Thus, further review of the device at issue is warranted, given the selection parameters.

Figure 5:
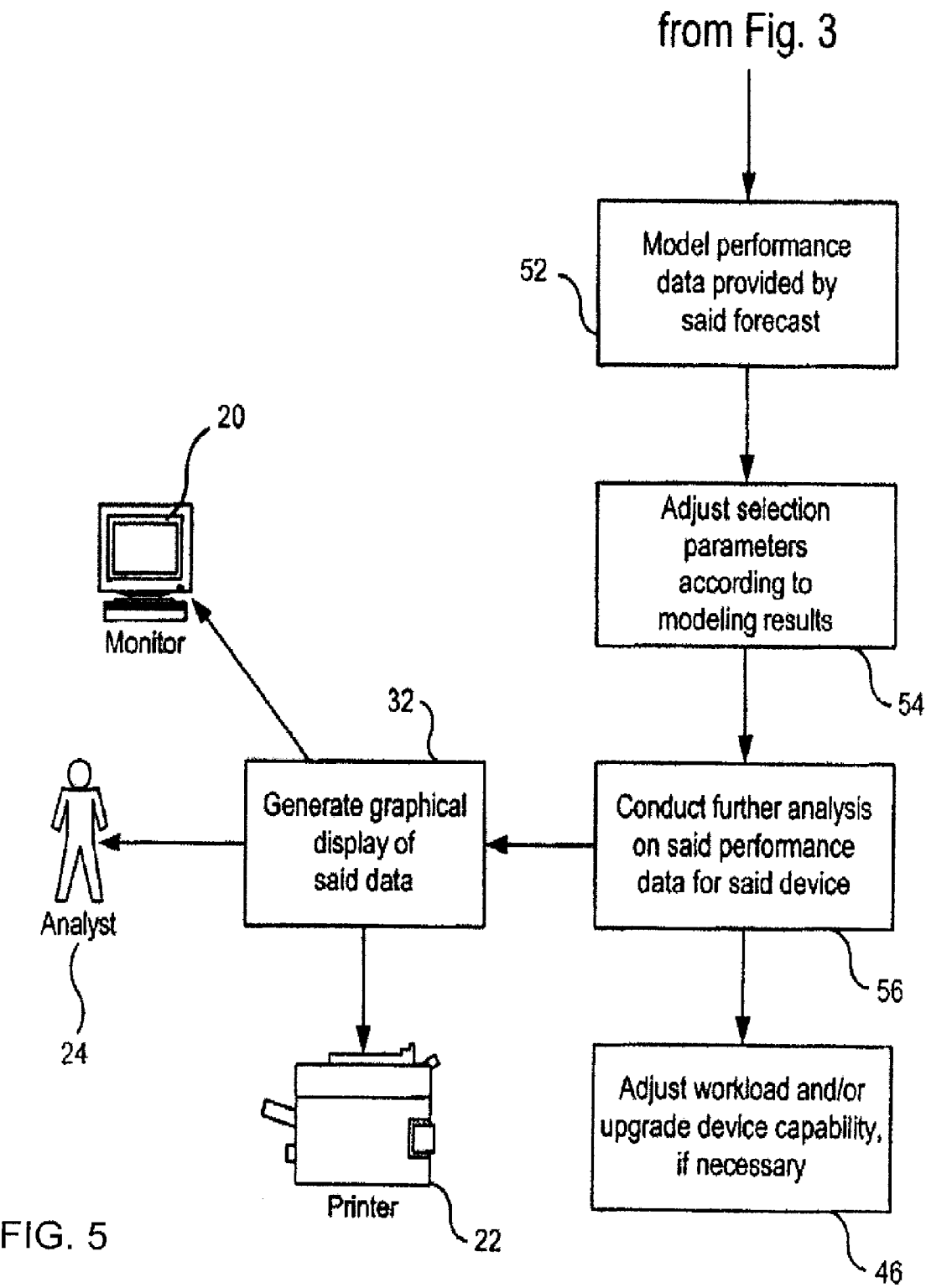
Figure 6:
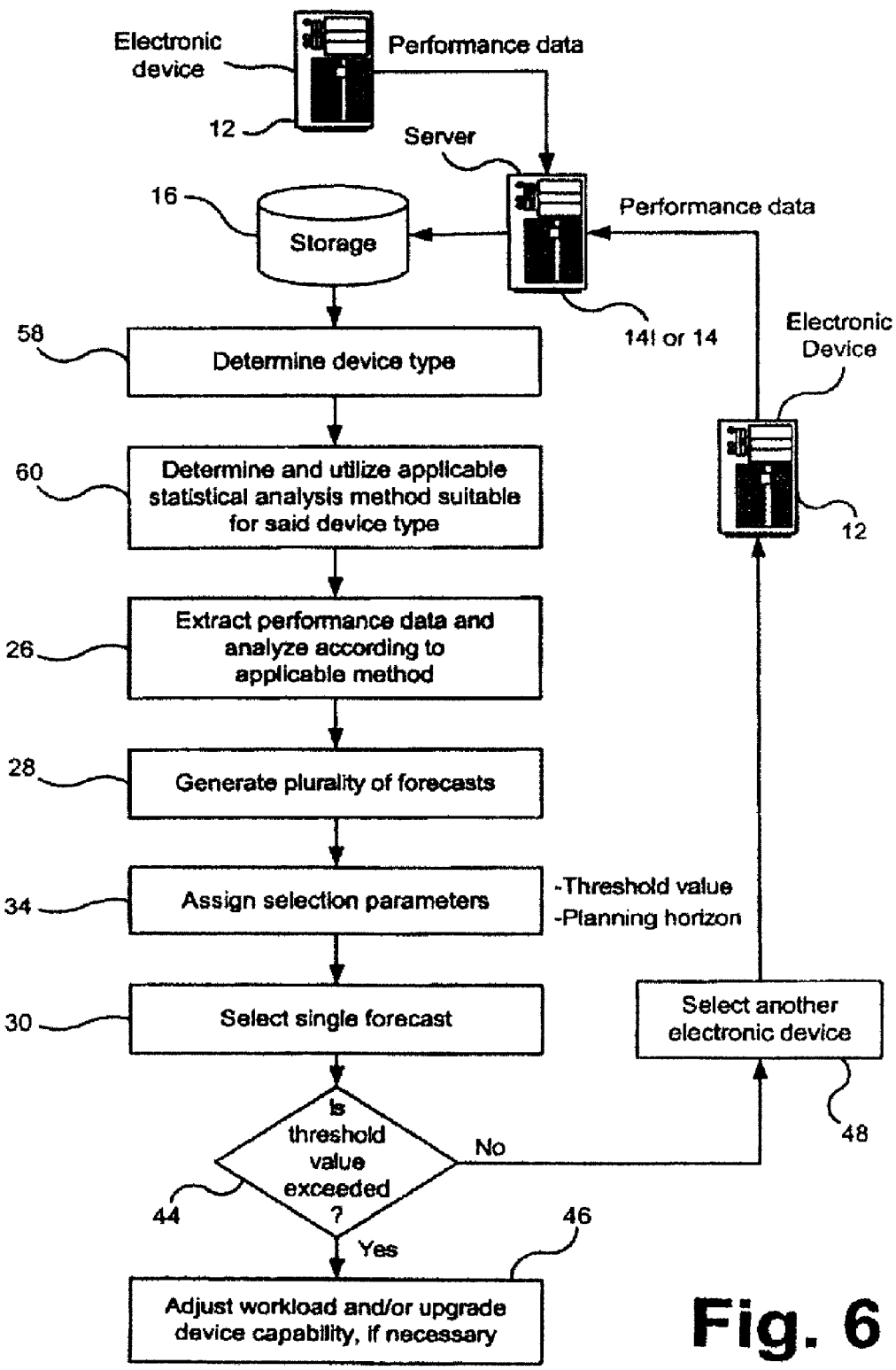

FIG. 4 graphically illustrates the actual capacity data 36, the selected capacity threshold 38, the total capacity 40, and the forecasted performance of a device 42 in light of collected performance data. In one embodiment, the planning horizon is chosen based on the estimated time it would take to repair and/or upgrade the device at issue. Further, in one embodiment, the single forecast selected by the system is the most conservative forecast relating to the device upon which statistical analysis has been performed. Thus, the present invention allows the user to save time and effort by reviewing only those forecasts indicating an urgent need for review, as illustrated by boxes 44 and 46 of FIGS. 5 and 6. This process may then be repeated for additional individual devices or an aggregate of devices, as illustrated by box 48.

Data modeling for the purpose of generating forecasts, as illustrated by box 52, is well known in the art. For the purposes of the present invention, any reasonable linear or non-linear statistical model (such as a polynomial or an exponential model) may be utilized to forecast when the capacity threshold of an electronic device will be exceeded. In one embodiment, a log-linear model is utilized because it provides conservative forecasts for many electronic devices. In many cases, the resource consumption growth of an electronic device will behave in a log-linear fashion. Thus, for many electronic devices, the log-linear model provides the most accurate forecasting results.

This model takes the form of $Y=Ac^{Bx}$, where Y is the actual capacity consumed, X is the time or date of consumption, c is the rate of exponential change, and A and B are model parameters to be estimated from the data. One may assume any value for c, or, in one embodiment, estimate the value of c from actual data. However, in this example, c is taken to be 2.71828.

In one embodiment, the forecasting procedure utilized by the present invention for this example model begins by converting the exponential model to natural logarithms, i.e., Ln Y=Ln A+Bx, and then utilizing linear regression to determine estimates of Ln A and B. In order to determine an estimate for Y, the present invention calculates $e^{Ln\ A+Bx}$ by replacing Ln A and B with their respective estimates. The use of linear regression is well known in the art and is available in many statistical analysis computer packages.

For the data shown in the example of FIG. 4, the estimate of Ln A equals −59.46628, and the estimate of B equals 0.00396. For example, if the date x is taken to be Aug. 1, 2001, the estimated capacity consumed would equal 1.97. Thus, the value of x utilized by the example of FIG. 4 is 15,188, which is the number of days from Jan. 1, 1960, to Aug. 1, 2001. As mentioned above, models different from the exponential method described above would require different methods for estimating the model parameters. It being understood that the present invention is capable of utilizing any of such statistical models during the analysis process.

Forecasting techniques may be applied either to peak, average, ninety-fifth percentile, minimum, or any other chosen statistic in order to provide a statistical confidence interval for each forecast. Further, the present invention may be applied to software applications executed by one or more electronic devices. In one embodiment, forecasts may be sorted by date in order to inform the user or administrator which device(s) require the most immediate attention. Further, each forecast may be reviewed and validated by one or more analysts familiar with the device at issue, as illustrated by box 50. In some cases, the analyst agrees with the forecasted data and begins an upgrade and/or adjustment of the device to prevent performance degradation. In other cases, forecasted data may be in error such that the analyst recommends that the forecast be disregarded, as illustrated by box 49.

Subsequent to the review of the selected forecasts by the analyst, the selection parameters discussed above may be adjusted according to the modeling results, as illustrated by box 54. Further, the statistical analysis methodology utilized by the present invention may be adjusted based upon the knowledge and experience of the analyst with respect to the device at issue. In one embodiment, additional statistical analysis as illustrated by box 56 is conducted utilizing adjusted selection parameters to create a subsequent graphical display for further review by the analyst, as illustrated by box 32. Different types of electronic devices may require different statistical analysis methodologies. For example, if the user desires to analyze a large system comprising a plurality of different types of devices, the planning horizon and threshold capacity would require adjustment. Further, the statistical methods utilized for each type of device may require adjustment in order to produce the most conservative forecast results. For example, a first statistical analysis method may take all of the input data into account such that each data point is weighted equally. However, a second data analysis technique may weigh the most recent data points more heavily, depending on which technique is being utilized. Thus, depending on the type of statistical analysis technique employed, the forecasted results will change accordingly.

In one embodiment, the present invention allows the user to choose from a host of statistical analysis methods complete with explanation as to what device types are most suited for each of said statistical analysis methods. Further, in one embodiment, the present invention provides the analyst with guidelines regarding the time required to upgrade/adjust various types of electronic components. This feature of the present invention allows the analyst to easily choose his or her selection parameters, thus providing the analyst or other user with enhanced efficiency and ease of use.

Further, the processing unit of the present invention is capable of determining the device type based upon the format of the data collected and stored upon the storage device, as illustrated by box 58. In one embodiment, the metadata characteristics of the performance data for each electronic device is utilized by the processing unit to determine the type of device at issue. Once the device type has been ascertained, the system is capable of automatically, or through manual direction, selecting and utilizing the most appropriate statistical analysis method and/or selection parameters suitable for the device type at issue, as illustrated by box 60. The above analysis process may then be repeated utilizing the methods/parameters best suited to the device(s) at issue.

It should be understood that the present invention is not relegated to the use of capacity data or any other particular number or type of device, as in the above example. On the contrary, the present invention may utilize any metric, or combination of metrics, such as intensities, in place of or in addition to system utilization data. For example, electronic device usage may fluctuate according to traffic and/or maintenance patterns. The present invention allows the analyst to adjust the forecasting results to compensate for peak and off-peak workload patterns, as well as maintenance or resource allocation procedures. This information may be stored on the storage device for use in conjunction with performance data collected from the device(s) during statistical analysis. Further, such information, through the display and reporting capabilities of the present invention, may assist the analyst in consolidating and/or adjusting workload or load balancing parameters.

This feature of the present invention is particularly useful when applied to a large number of electronic devices undergoing aggregate statistical analysis. Specifically, selected forecasts maybe aggregated in order to present the analyst with a performance overview of analyzed devices working in combination. This allows the analyst to conduct load balancing and/or consolidate workloads over multiple devices. The reporting capabilities described above may be utilized to provide the analyst with best and/or worst case forecasts designed to provide an overall "level of confidence". In one embodiment, this is accomplished through graphical and/or textual display of performance data.

A linear growth model and an exponential growth model may be used to predict capacity outage for a device. A capacity outage may be predicted when either model crosses a predetermined threshold. Additionally, the collection of data from the electronic devices 12, and the subsequent statistical analysis and forecast generation to predict performance of the electronic devices 12, may include irrelevant data. Desirably, such irrelevant data is identified and eliminated from subsequent analysis.

Figure 7:
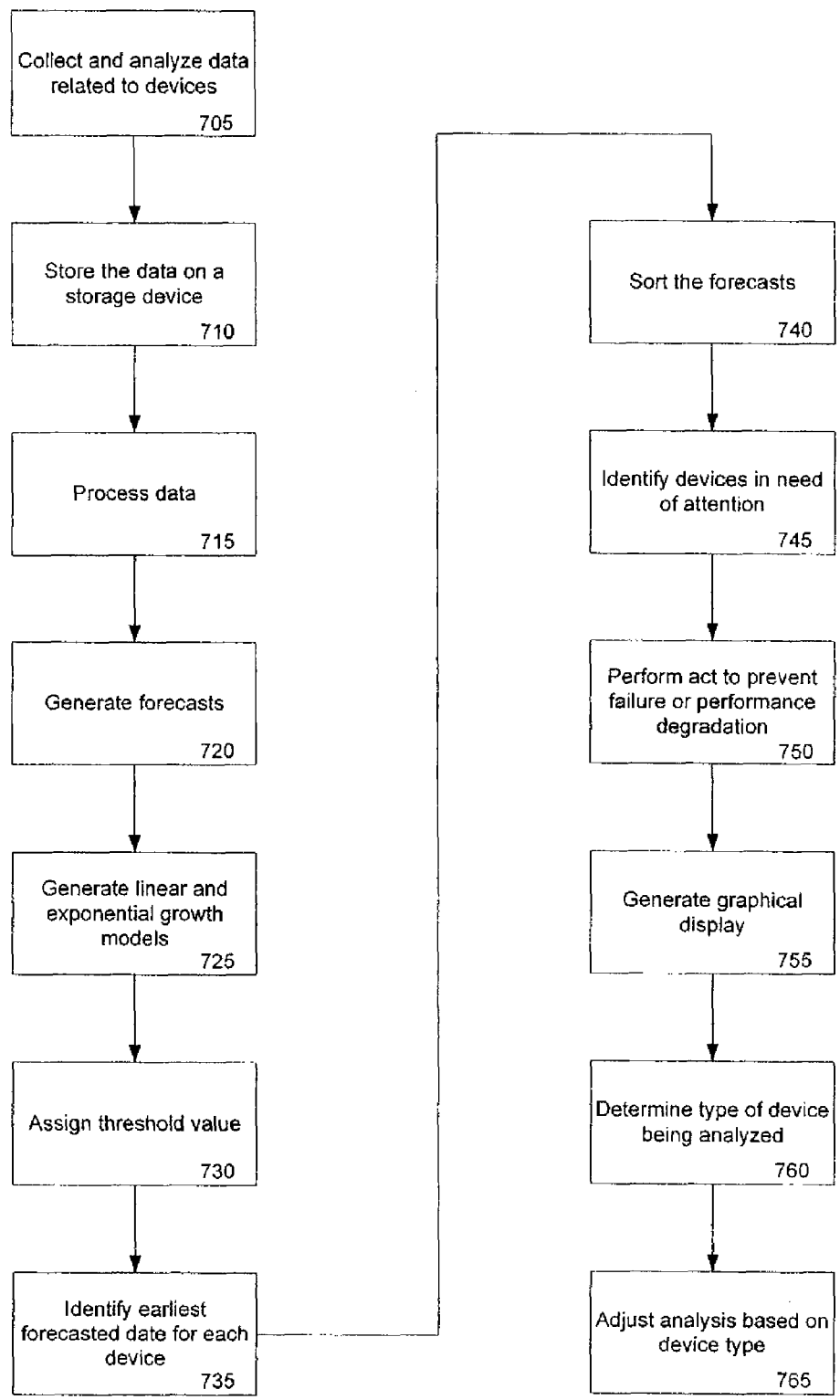
FIG. 7 is a flow diagram illustrating an example method of managing a group of electronic devices.

FIG. 7 is a flow diagram illustrating an example method of managing a group of electronic devices 12. At 705, data relating to the devices 12 is collected and analyzed. The data may be historic resource utilization data and may, for example, represent a load placed on a set of finite resources over a specified and predefined period of time. At 710, the data is stored on a storage device, such as the storage device 16. At 715, the data may be processed. Irrelevant data may be identified and disregarded or otherwise eliminated.

At 720, forecasts may be generated. The forecasts may include one or more resource utilization forecasts for each device 12. Both linear and exponential growth models may be used in conjunction to predict a capacity outage for the plurality of electronic devices 12. The models may be considered a forecast for the outage of the devices, and may, in particular, be a resource utilization forecast. A threshold may be defined for each model, and the crossing point of the threshold may indicate the resource utilization, such as the capacity outage.

A linear model may be used to predict a capacity outage date. For example, for a linear model, the capacity outage date may be defined as the date the 84% confidence interval crossed the threshold. 84% is one standard deviation of a one-tailed normal distribution. Based on the assumption that linear regression errors are normally distributed, this creates a 1-sigma safety factor for the linear model. The exponential growth model may be adjusted to a linear growth model when a defined criterion or criteria is met in order to avoid overextrapolation. For example, once the slope of an exponential model becomes twice its slope as of the end of the historic data, the curve is converted to a straight line.

At 725, linear and exponential growth models may be generated. At 730, a threshold value may be assigned. The threshold value may be used to identify devices 12 whose forecasted resource utilization exceeds the threshold value within the predefined period of time. At 735, for each device 12, the earliest forecasted date that the threshold will be exceeded is identified. Then at 740, the various forecasts are sorted by the identified dates. At 745, the device or devices 12 that are in need of immediate and prompt attention in order to prevent a failure or performance degradation are identified. At 750, an act to prevent the failure or performance degradation is performed. The act may be performing an additional analysis related to the devices 12. The act may alternately or additionally include the adjustment of the workload and the capability of the devices 12.

At 755, a graphical display of one or more of the forecasts may be generated. The forecast may represent an acceptable level of performance degradation associated with the electronic devices 12.

Furthermore, at 760, a device type of the electronic device 12 being analyzed may be determined. The device type may dictate the need for a certain type of analysis. For example, certain analyses may be inapplicable for certain devices. At 765, the statistical analysis may be adjusted and/or changed depending on the device type.

As mentioned above, while exemplary embodiments of the invention have been described in connection with various computing devices, the underlying concepts may be applied to any computing device or system. Thus, the methods and systems of the present invention may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the invention.

As is apparent from the above, all or portions of the various systems, methods, and aspects of the present invention may be embodied in hardware, software, or a combination of both.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A method comprising:
using one or more processors to perform the following:
collecting and analyzing historic resource utilization data relating to a plurality of computing devices, the historic resource utilization data representing a load placed on a set of finite resources over a predefined period of time, wherein irrelevant data from the historic resource utilization data is identified and eliminated;
generating an exponential growth model for each computing device based on analysis of the historic resource utilization data;
generating a linear growth model for a particular computing device by adjusting the exponential growth model into the linear growth model when a defined criterion which pertains to the exponential growth model is met, wherein the defined criterion includes when the historic resource utilization data generates a slope of the exponential growth model that exceeds a threshold scale factor of a slope of an end of a most recent portion of the historic resource utilization data in the exponential growth model;
creating a resource utilization forecast for each computing device from the exponential growth model or the linear growth model;
receiving an assignment of a threshold value for the resource utilization forecast of each computing device;
identifying an earliest forecasted date the threshold value is exceeded for the particular computing device based on the resource utilization forecast and the threshold value of each computing device; and
sorting a number of resource utilization forecasts by the identified date for each of the number of resource utilization forecasts, wherein the number of resource utilization forecasts includes linear and exponential growth models.

2. The method of claim 1, wherein the threshold value for the linear growth model is substantially at an 84% confidence interval.

3. The method of claim 1, wherein the threshold value for the linear growth model creates a 1-sigma safety factor.

4. The method of claim 1, further comprising determining a type of the computing device based on a format of the collected historic resource utilization data.

5. The method of claim 1, wherein identifying an earliest forecasted date comprises identifying where the threshold v/due is exceeded first for the linear growth model and the exponential growth model.

6. The method of claim 1, further comprising:
determining whether the particular computing device is in need of attention to prevent a failure or performance degradation based on the resource utilization forecast for the particular computing device and the assignment of the threshold value; and
adjusting workload or capability of the plurality of computing devices based on a determination that the particular computing device is in need of attention.

7. A non-transitory computer-readable medium having computer-readable instructions stored thereon that are executable by a processor to:
collect and analyze historic resource utilization data relating to a plurality of computing devices, the historic resource utilization data representing a load placed on a set of finite resources over a predefined period of time wherein irrelevant data from the historic resource utilization data is identified and eliminated;
generate an exponential growth model for each computing device based on analysis of the historic resource utilization data;
generate a linear growth model for a particular computing device by adjusting the exponential growth model into the linear growth model when a defined criterion which pertains to the exponential growth model is met, wherein the defined criterion includes when the historic resource utilization data generates a slope of the exponential growth model that exceeds a multiple of a slope of an end of a most recent portion of the historic resource utilization data in the exponential growth model;
create a resource utilization forecast for each computing device from the exponential growth model or the linear growth model;
receive an assignment of a threshold value for the resource utilization forecast of each computing device;
identify an earliest forecasted date the threshold value is exceeded for the particular computing device based on the resource utilization forecast and the threshold value of each computing device; and
sort a number of resource utilization forecasts by the identified date for each of the number of resource utilization forecasts, wherein the number of resource utilization forecasts includes linear and exponential growth models.

8. The computer readable medium of claim 7, wherein the threshold value for the linear growth model is substantially at an 84% confidence interval.

9. The computer readable medium of claim 7, wherein the threshold value for the linear growth model creates a 1-sigma safety factor.

10. The computing computer readable medium of claim 7, further comprising instructions stored thereon that are executed by the processor to determine a type of the computing device based on a format of the collected historic resource utilization data.

11. The computer readable medium of claim 7, wherein the instructions to identify the earliest forecasted date cause the processor to identify where the threshold value is exceeded first for the linear growth model and the exponential growth model.

12. The computer readable medium of claim 7, further comprising instructions stored thereon that are executed by the processor to:

determine whether the particular computing device is in need of attention to prevent a failure or performance degradation based on the resource utilization forecast for the particular computing device and the assignment of the threshold value; and adjust workload or capability of the plurality of computing devices based on a determination that the particular computing device is in need of attention.

13. A system comprising:

a processor and memory;

a subsystem deployed in the memory and executed by the processor to collect and analyze historic resource utilization data relating to a plurality of computing devices, the historic resource utilization data representing a load placed on a set of finite resources over a predefined period of time, wherein irrelevant data from the historic resource utilization data is identified and eliminated;

a subsystem deployed in the memory and executed by the processor to generate an exponential growth model for each computing device based on analysis of the historic resource utilization data;

a subsystem deployed in the memory and executed by the processor to generate a linear growth model for a particular computing device by adjusting the exponential growth model into the linear growth model when a defined criterion which pertains to the exponential growth model is met, wherein the defined criterion includes when the historic resource utilization data generates a slope of the exponential growth model that exceeds a multiple of a slope of an end of a most recent portion of the historic resource utilization data in the exponential growth model;

a subsystem deployed in the memory and executed by the processor to create a resource utilization forecast for each computing device from the exponential growth model or the linear growth model;

a subsystem deployed in the memory and executed by the processor receive an assignment of a threshold value for the resource utilization forecast of each computing device;

a subsystem deployed in the memory and executed by the processor identify an earliest forecasted date the threshold value is exceeded for the particular computing device based on the resource utilization forecast and the threshold value of each computing device; and a subsystem deployed in the memory and executed by the processor to sort a number of resource utilization forecasts by the identified date for each of the number of resource utilization forecasts, wherein the number of resource utilization forecasts includes linear and exponential growth models.

14. The system of claim 13, wherein the threshold value for the linear growth model is substantially at an 84% confidence interval.

15. The system of claim 13, wherein the threshold value for the linear growth model creates a 1-sigma safety factor.

16. The system of claim 13, wherein identification of the earliest forecasted date includes identification of where the threshold value is exceeded first for the linear growth model and the adjusted exponential growth model.

17. The system of claim 13, further comprising:

determining whether the particular computing device is in need of attention to prevent a failure or performance degradation based on the resource utilization forecast for the particular computing device and the assignment of the threshold value; and adjusting workload or capability of the plurality of computing devices based on a determination that the particular computing device is in need of attention.

* * * * *